Patented Apr. 19, 1927.

1,624,944

UNITED STATES PATENT OFFICE.

EUGEN GLIETENBERG, OF LEVERKUSEN, GERMANY, ASSIGNOR TO GRASSELLI DYE-STUFF CORPORATION, OF NEW YORK, N. Y., A CORPORATION OF DELAWARE.

AZO DYESTUFFS FROM AMINODIPHENYLENOXIDE.

No Drawing. Application filed December 2, 1925, Serial No. 72,814, and in Germany December 11, 1924.

I have found that the azo dyestuffs which are obtained by coupling diazotized aminodiphenylenoxide of the formula

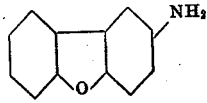

with the arylids of the 2-3-hydroxynaphthoic acid are of very desirable shades and properties. They are in several respects superior to similar dyestuffs obtained from 2-3-hydroxynaphthoic acid arylids and simple aromatic diazo compounds or diazo compounds of diphenyloxid.

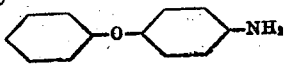

Amongst the arylids being particularly suited for my invention I might mention the alpha and beta-naphthalid, the chlortoluidids, the anisidid and their chlorsubstitution products. When produced in substance my new dyestuffs are dark powders, substantially insoluble in water. By reduction as with zinc and hydrochloric acid they yield an aminodiphenylenoxide compound and an amino-2-3-hydroxynaphthoic acid arylid compound. In order to produce my novel compounds on the fibre the latter is usually first impregnated with an alkaline solution of the naphthoic-arylid, and the diazo solution either printed upon the cotton cloth or the fibre passed through a bath containing the diazo compound.

The following example will further illustrate my invention, it being understood that my invention is not limited to the particular material, proportions or conditions mentioned.

My novel products are particularly distinguished by clear claret shades and when produced directly on the fibre, by a very superior fastness to light and kier boiling. They are obtained by diazotizing an aminodiphenylenoxide, a diaminodiphenylenoxid or other substitution products of aminodiphenylenoxide and coupling with a 2-3-hydroxynaphthoic acid arylid. The following structural formula represents an example of a dyestuff obtainable from a diaminodiphenylenoxid:

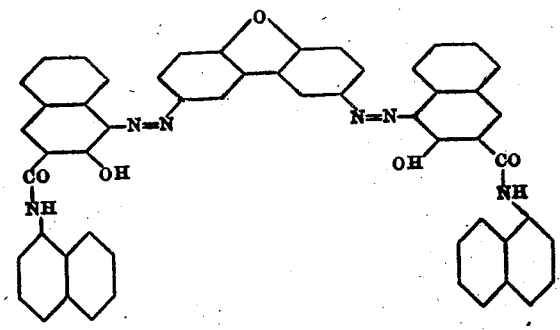

A cotton hank which has been impregnated with an alkaline solution containing approximately 20 grams 2-3-hydroxynaphthoic acid-αnaphthylid per litre is passed through a bath containing diazotized aminodiphenylenoxide of the formula

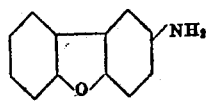

and excess sodium acetate. The cotton is dyed an intense and clear Bordeaux of excellent fastness to washing, chlorine and kier boiling.

I claim:

1. As new products azo dyestuffs of the general formula

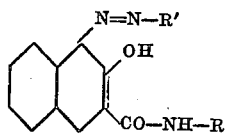

in which R is an aryl radicle and R' the radicle of a diphenylenoxid compound, which are deep reddish colored powders, practically insoluble in water and which by reduction yield an aminodiphenylenoxide compound, and an amino-2-3-hydroxynaphthoic acid arylid.

2. As a new product the azo dyestuff having most probably the formula

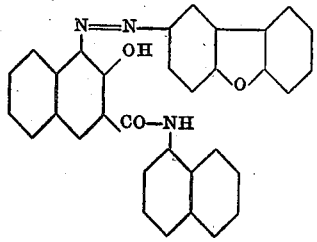

which is a deep red powder, practically insoluble in water and yielding on reduction aminodiphenylenoxide and an amino-2-3-hydroxynaphthoic acid-alpha-naphthalid.

3. As new products vegetable fibres dyed deep Bordeaux red shades, exceedingly fast to kier boiling with azo dyestuffs of the general formula

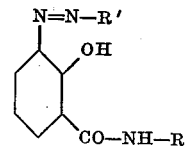

in which R is an aryl radicle and R' the radicle of a diphenylenoxid compound.

4. As new products vegetable fibres dyed deep Bordeaux red shades, exceedingly fast to chlorine, washing and kier boiling, with azo dyestuffs of the probable formula

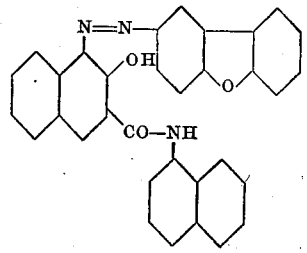

In testimony whereof I have hereunto set my hand.

EUGEN GLIETENBERG.